(12) United States Patent
Lundbäck et al.

(10) Patent No.: US 6,912,590 B1
(45) Date of Patent: Jun. 28, 2005

(54) SINGLE IP-ADDRESSING FOR A TELECOMMUNICATIONS PLATFORM WITH A MULTI-PROCESSOR CLUSTER USING A DISTRIBUTED SOCKET BASED INTERNET PROTOCOL (IP) HANDLER

(75) Inventors: Arne Lundbäck, Skogas (SE); Göran Hansson, Årsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/467,018

(22) Filed: Dec. 20, 1999

Related U.S. Application Data

(63) Continuation of application No. PCT/IB98/02080, filed on Dec. 18, 1998.

(51) Int. Cl.[7] .................... G06F 15/173; H04L 15/56
(52) U.S. Cl. ............... 709/238; 370/395.52; 709/230; 719/319; 719/320
(58) Field of Search .............................. 709/200–201, 709/217–219, 230, 238, 400; 370/395.5, 395.52, 351, 352.7, 392, 397, 399, 395.51, 409; 719/319–320; 379/219, 142.07, 220.01, 221.14; 716/12, 14

(56) References Cited

U.S. PATENT DOCUMENTS

| 5,619,650 A | * | 4/1997 | Bach et al. ................. 709/246 |
| 5,787,248 A | | 7/1998 | Zupcsics et al. |
| 6,006,259 A | * | 12/1999 | Adelman et al. ............ 709/223 |
| 6,108,701 A | * | 8/2000 | Davies et al. ................ 709/224 |
| 6,185,619 B1 | * | 2/2001 | Joffe et al. ................... 709/229 |
| 6,205,479 B1 | * | 3/2001 | Dulai et al. .................. 709/225 |
| 6,266,335 B1 | * | 7/2001 | Bhaskaran ................... 370/399 |
| 6,370,583 B1 | * | 4/2002 | Fishler et al. ................ 709/238 |

FOREIGN PATENT DOCUMENTS

| GB | 2 309 619 A | | 7/1997 | |
| WO | WO 97/47119 A1 | | 12/1997 | |
| WO | WO 98/19412 A1 | | 4/1998 | |
| WO | WO 99/33227 | * | 7/1999 | ............ H04L/12/28 |

OTHER PUBLICATIONS

Clustering, Westimacott, I., technical editor, SunExpert Magazine, Jun. 1998, p. 78–80.*
ONE–IP: Techniquess for Hosting a Service on a Cluster of Machines, Damani, et al., Computer Networks and ISDN Systems, 1997, pp. 1–12.*

* cited by examiner

*Primary Examiner*—Beatriz Prieto
(74) *Attorney, Agent, or Firm*—Nixon & Vanderhye, P.C.

(57) ABSTRACT

A telecommunications platform has a cluster of processors which collectively perform a platform processing function. Plural processors of the cluster have Internet Protocol (IP) capabilities and respective plural IP interfaces. The plural processors of the cluster all have a same IP address. An Internet Protocol (IP) handler distributed throughout the cluster renders the IP interfaces of the plural processors of the cluster exchangeable so that knowledge of which one of the plural processors of the cluster is hosting an IP software application being accessed is unnecessary when selecting one of the plural IP interfaces for connecting to the cluster.

19 Claims, 13 Drawing Sheets

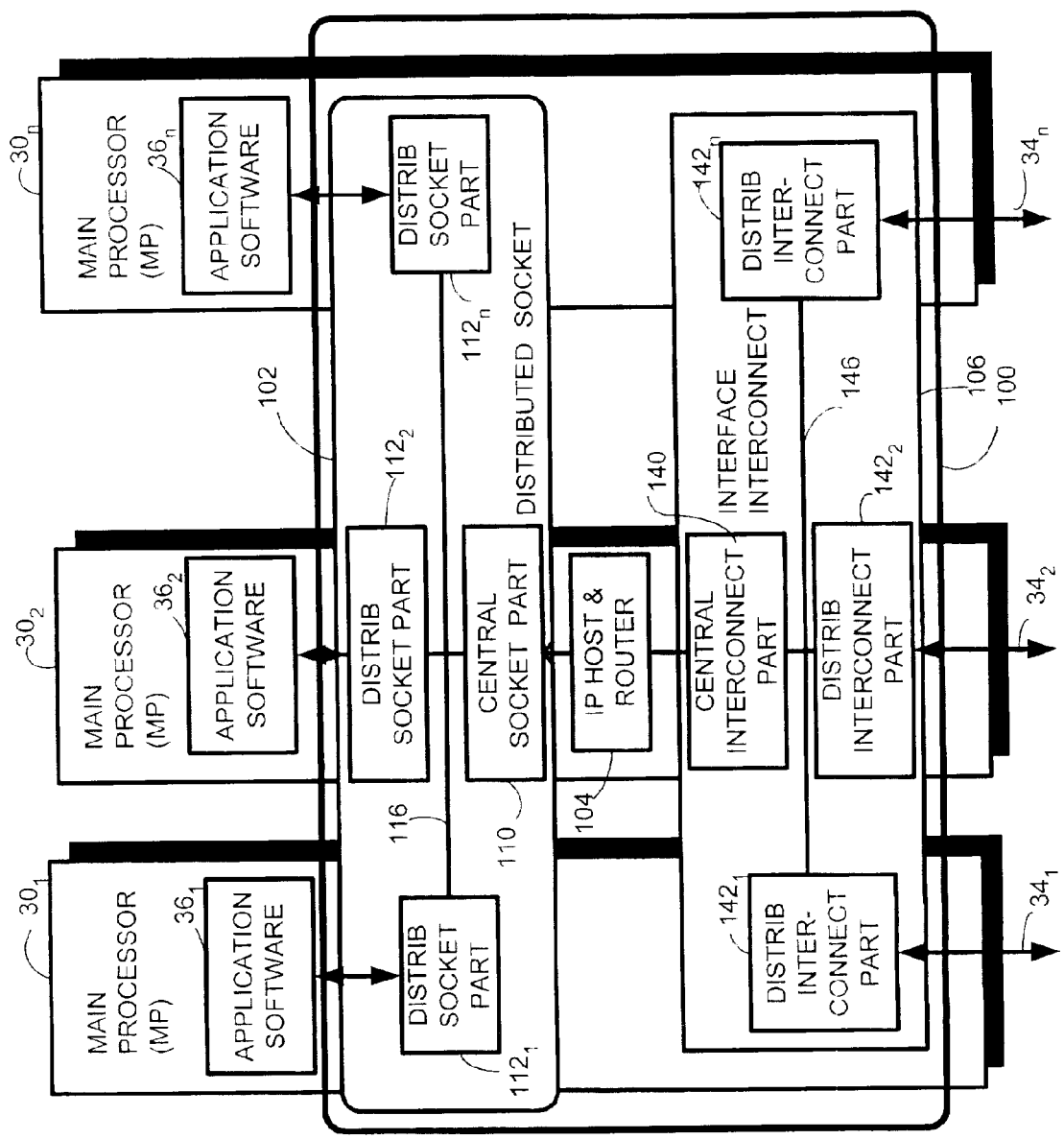

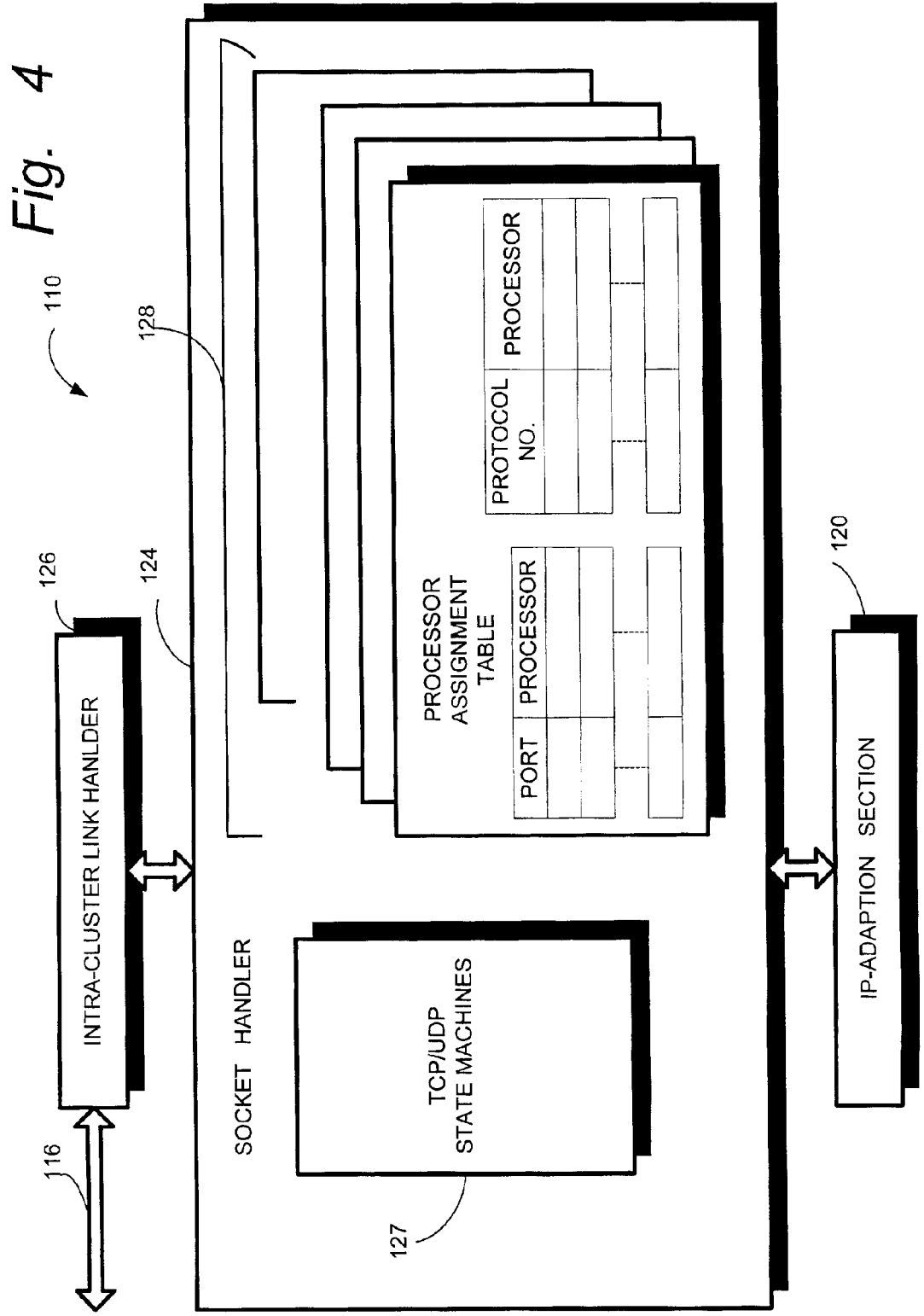

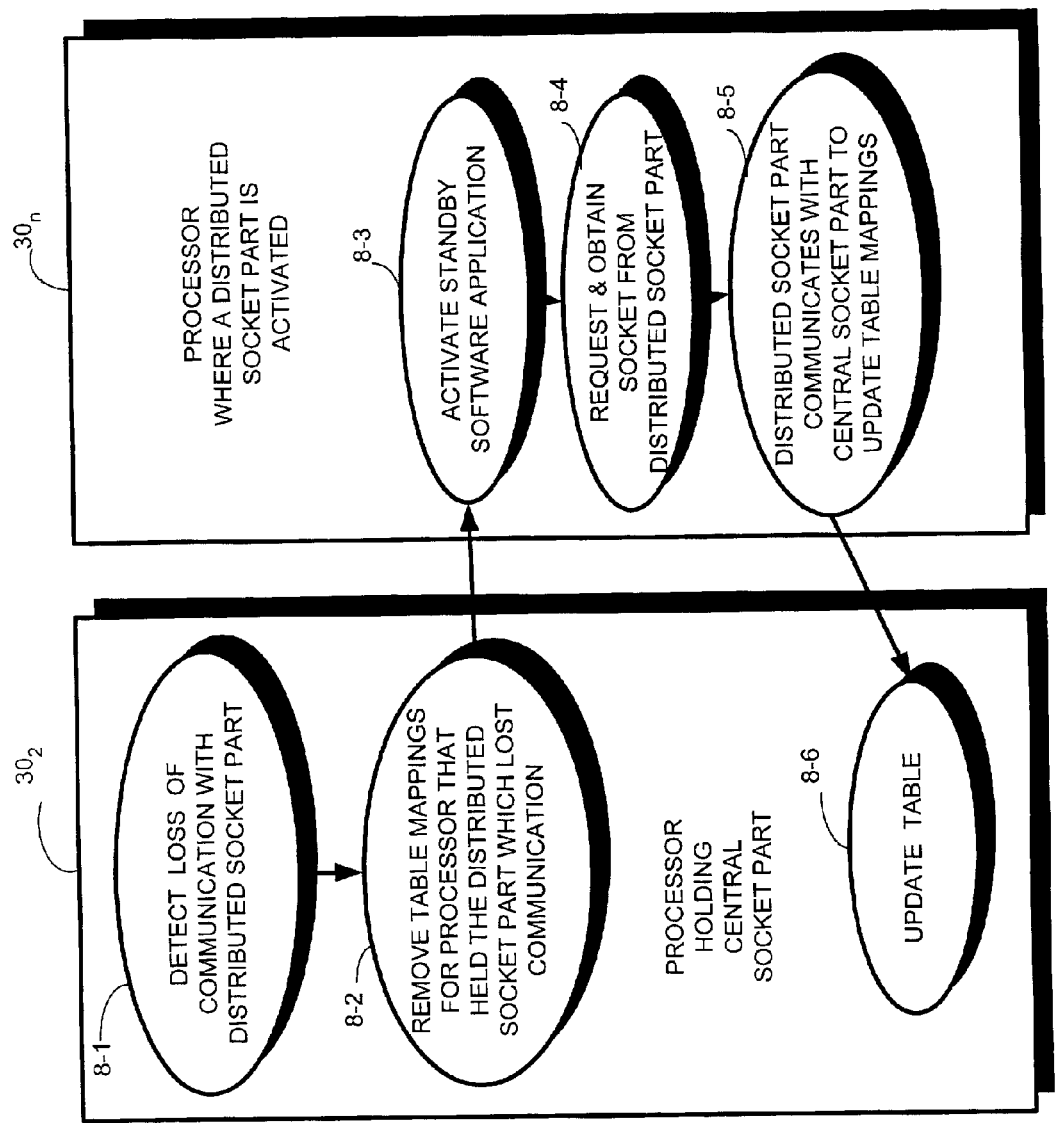

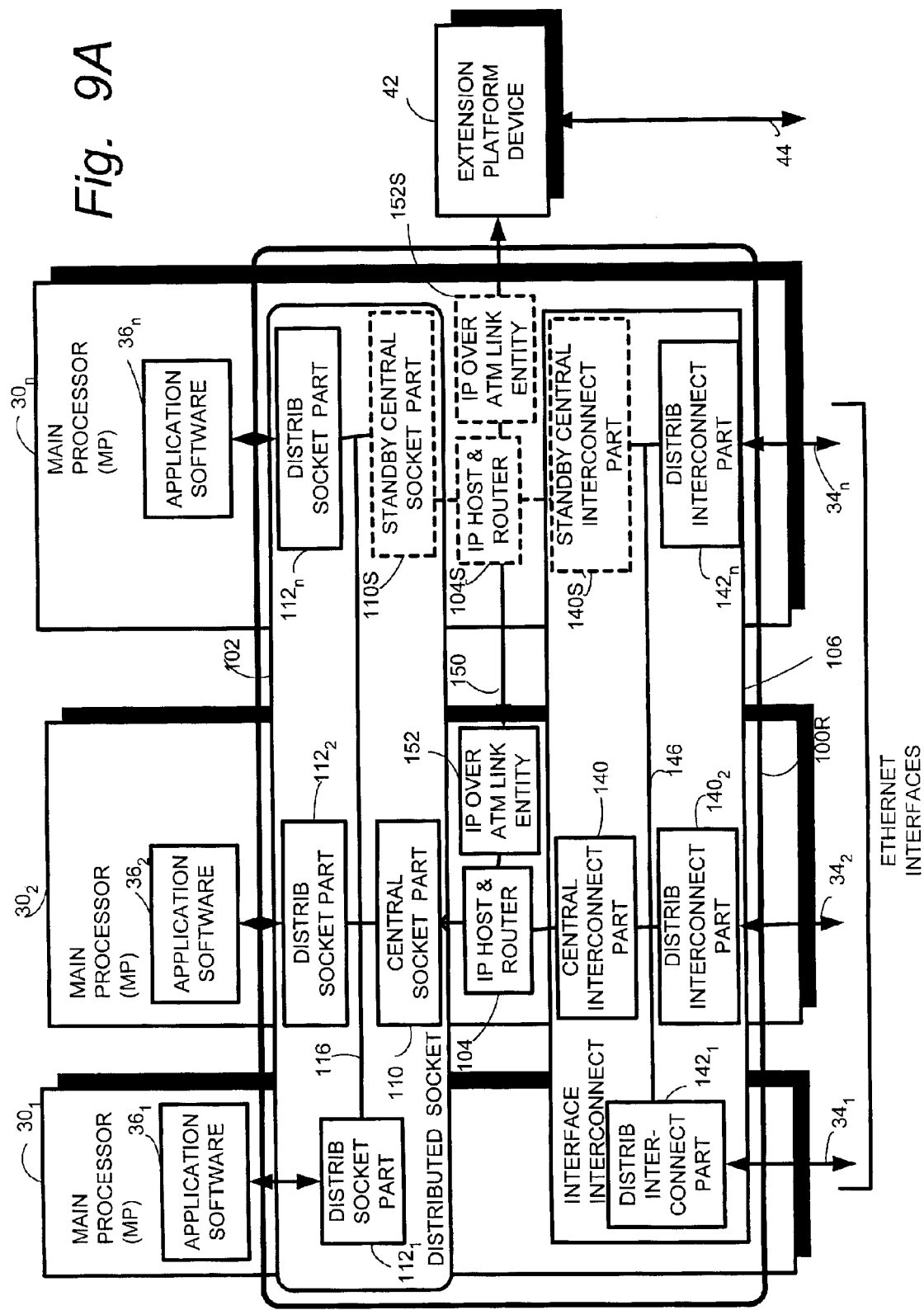

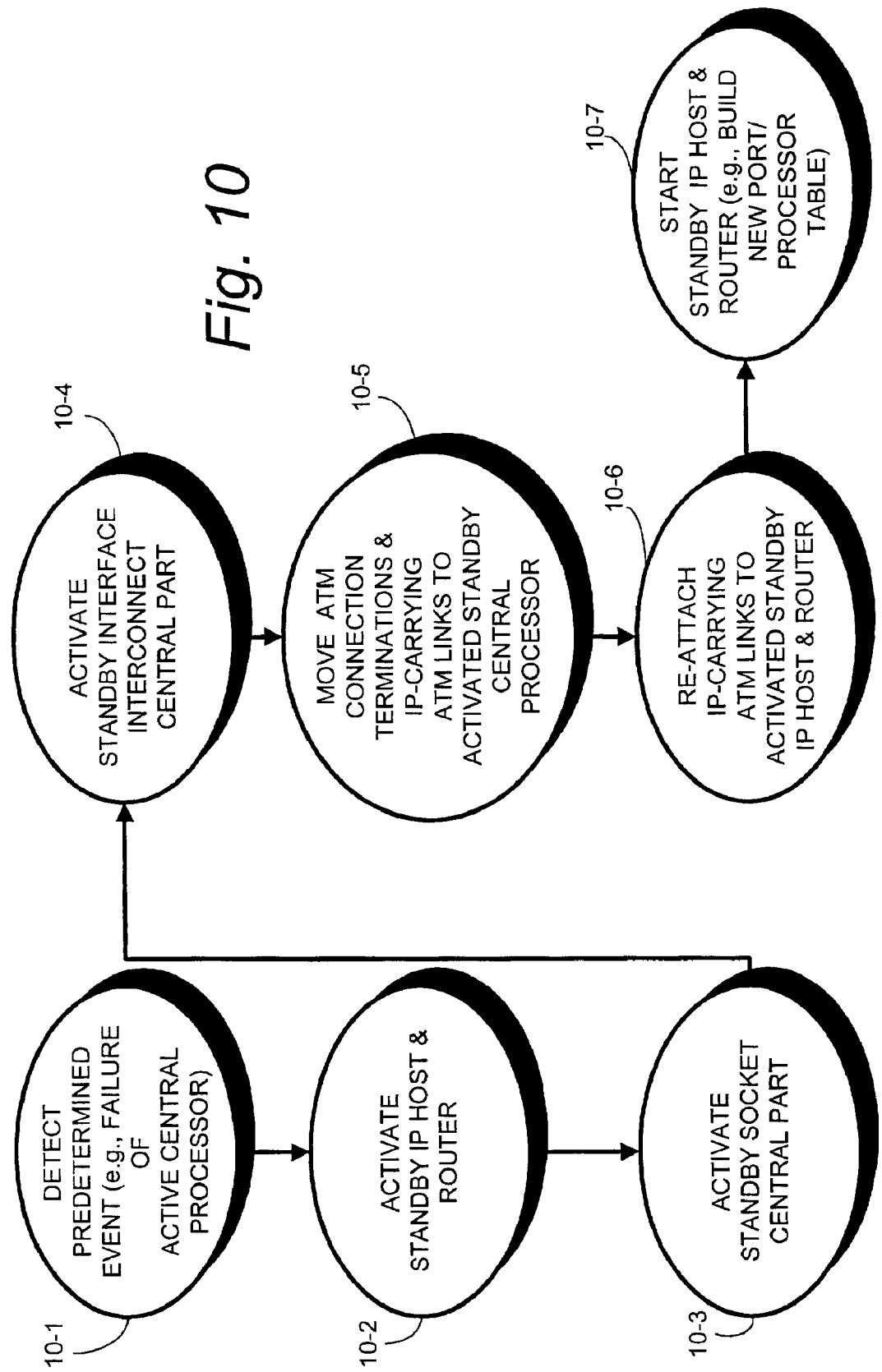

SINGLE IP-ADDRESSING FOR A TELECOMMUNICATIONS PLATFORM WITH A MULTI-PROCESSOR CLUSTER USING A DISTRIBUTED SOCKET BASED INTERNET PROTOCOL (IP) HANDLER

This application is a continuation of International Patent Application PCT/IB98/02080 filed Dec. 18, 1998, entitled "Telecommunication 15", which is incorporated herein by reference.

BACKGROUND

1. Field of the Invention

The present invention pertains to platforms of a telecommunications system, and particularly to such platforms having a multi-processor configuration and Internet Protocol (IP) capabilities.

2. Related Art and other Considerations

An Internet Protocol (IP) network comprises Internet Protocol (IP) routers, links that transport Internet Protocol (IP) packets between routers, and hosts. An Internet Protocol (IP) router forwards Internet Protocol (IP) packets received at incoming links to suitable outgoing links for onward transportation through the network. The outgoing links are selected by looking at a destination IP address in the IP packets and comparing them with information in a routing table. The routing table contains information about a next hop (router) address to which to send the packets, and also information about which outgoing link to use to reach that next hop address. An Internet Protocol (IP) host is a device that contains Internet Protocol (IP) functionality to generate or receive IP packets, but no IP forwarding functionality. Often a device contains both host and router functionality. A link is attached to a host and/or a router via a link interface. A link interface has an assigned IP address.

When a host is connected to an Internet Protocol (IP) network via a link attached to a link interface, the Internet Protocol (IP) address of the link interface is used as a destination IP address for the host. If more than one link is connected to a host, any of the IP addresses of the link interfaces may be used to address the host. The IP address of a link interface that is connected to a router may also be a next-hop address if the link is connected to another router.

Various types of transport services can be provided to a software application that uses an IP network for communication. Such transport services include the Transmission Control Protocol (TCP) transport service; the User Datagram Protocol (UDP) transport service; and the raw IP transport service (e.g., direct access to the Internet Protocol (IP) transport function). The TCP and UPD transport services provide additional functionality on top of the IP network transport function. TCP provides a connection-oriented service with reliable transport of data. That is, data is protected from loss, reordering, misinsertion, etc. UDP is a relatively non-reliable datagram service. Both TCP and UDP transport services operate end-to-end on a data flow. That is, TCP and UDP functions are not involved in intermediate nodes in the IP network, only the nodes where the data flow originates and terminates.

Typically, TCP, UDP, and raw IP transport services are provided to a user application via a socket interface. A "port" concept makes it possible for several applications to use TCP or UDP transport simultaneously via the same source IP address. Applications are separated from each other by using different TCP or UDP port numbers. Different user applications may use the same TCP or UDP port number if they use different IP source addresses, but if the same IP source address is used, different port numbers must be used. Some port numbers are reserved for specific, well-known applications.

A TCP segment or UDP datagram contains information about source and destination port numbers. A TCP segment or UDP datagram is sent in an IP packet. The IP packet contains information about the source and destination IP addresses.

When a user application initiates TCP or UDP communication, the user application creates a socket interface with the desired port number, and binds it to an IP source address. If TCP transport is used, a connection is established toward a destination socket specified by a destination port number and a destination IP address. If UDP is used, no connection is established. Instead, the destination socket is specified for every UDP datagram that is sent by submitting the destination port and the destination IP address. The raw IP transport service provides no additional functionality on top of the IP layer. The raw IP transport service basically provides a socket interface towards the IP layer transport function. Port numbers can not be used to separate different users when using the raw IP transport service. Instead, the protocol number in the IP header specifying the user protocol is used to separate different users. The protocol number is specified by a software application when it binds to a raw IP socket.

Functionality is generally provided for transporting IP packets over an ethernet Local Area Network (LAN). To the IP host and router function entity, the IP over ethernet link appears as a generic link. The ethernet dependent functionality is hidden from the IP host and router function. This includes an Address Resolution Protocol (ARP) that is used to translate IP addresses to ethernet Medium Access Control (MAC) addresses. When an IP over ethernet link needs to find out the ether net MAC address to a link interface attached to a host or router on an Ethernet LAN that has a specific IP address assigned to it, the IP over ethernet link function broadcasts an ARP Request message on the Ethernet LAN. The ARP request message contains the IP address whose MAC address is requested and also the MAC address of the link that sent out the ARP request, so that the response can be sent to the correct link interface. The IP over ethernet link interface that has the requested IP address will then respond with an ARP response message containing the requested MAC address. The IP over ethernet link entity that sent out the request then stores the MAC address of the IP address and uses it when data is to be sent to the concerned IP address. The ARP protocol is a standard function.

There also may be functionality in an IP network for transporting IP packets over an Asynchronous Transport Mode (ATM) network. The ATM dependent functionality is hidden from the IP host and router function. To transport IP packets over ATM, the ATM Adaptation Layer 5 (AAL5) is often used. The ATM dependent functionality includes, for example, functionality for encapsulating IP packets into AAL5 Service Data Units (SDUs). Encapsulation of IP packets into AAL5 SDUs is specified in the Internet Engineering Task Force (IETF) Request For Comment (RFC) number 1483. The ATM dependent functionality also includes functionality for translating IP addresses to ATM addresses.

In prior art multi-processor systems having internet capabilities, typically each processor involved with internet transmissions has a distinct internet protocol address which is closely tied to the hardware and Ethernet interface of the processor. The processors collectively form a local area network (LAN). Internet protocol (IP) traffic is routed to and from these processors either by a dedicated router connected to the same LAN or by one of the processors of the LAN running special router software.

It has become desirable in at least some multi-processor environments to view the processors from an external perspective as a single processing resource having a single IP address. What is needed in such situations, therefore, and an object of the present invention, is method and apparatus for handling IP-related applications on different processors all having the same IP address.

BRIEF SUMMARY OF THE INVENTION

A telecommunications platform has a cluster of processors which collectively perform a platform processing function. Plural processors of the cluster have Internet Protocol (IP) capabilities and respective plural IP interfaces. The plural processors of the cluster all have a same IP address. An Internet Protocol (IP) handler distributed throughout the cluster renders the IP interfaces of the plural processors of the cluster exchangeable so that knowledge of which one of the plural processors of the cluster is hosting an IP software application being accessed is unnecessary when selecting one of the plural IP interfaces for connecting to the cluster.

The Internet Protocol (IP) handler comprises an active router; a distributed socket; and an interface interconnect. The active router is hosted by at least one of the processors of the cluster, which processor is designated the active central processor. The interface interconnect interconnects the plural IP interfaces to the router and passes IP frames incoming to the platform to the router regardless of which of the plural IP interfaces receives the frames. The socket comprises both an active socket central part (hosted by the active central processor) and socket distributed parts. The active socket central part has a set of processor assignment tables which is utilized to determine which one of the plural processors of the cluster is hosting an IP software application being accessed (e.g., to which processor the IP packets incoming to the platform are intended). The active socket central part forwards the IP packets to the socket distributed part for the intended processor, and the internet protocol (IP) software application receives the IP frames from the socket distributed part.

The Internet Protocol (IP) handler is capable of handling different types of IP interfaces, such as Ethernet interfaces connected to the main processors of the main processor cluster (MPC) as well as other types of interfaces. An example of such other type of interface is an ATM interface which carries IP packets over an inter-platform link.

The Internet Protocol (IP) handler has redundancy making it fault tolerant. In one embodiment, to cater to potential failure of the active central processor of the cluster, the Internet Protocol (IP) handler has a standby router, a standby socket central part, and a standby interface interconnect central part. Upon detection of a predetermined event such as a failure of the active central processor, a switch over operation is performed wherein the standby functions are activated. IP links (e.g., sockets, ATM, and Ethernet) are automatically redirected to the standby functions in is the switch over operation.

In case of failure of one of the processors of the cluster (either a hardware or software failure), the active central processor of the Internet Protocol (IP) handler restarts a IP-related software application afflicted by the failure on another processor of the cluster (MPC). The IP-related software application then binds to the distributed part on its newly hosted processor, e.g., binds to the socket distributed part and the distributed interface interconnect part.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3 is a schematic view showing an example embodiment of the Internet Protocol (IP) handler of FIG. 2.

FIG. 4 is a schematic view of a distributed socket central part included in the Internet Protocol (IP) handler of FIG. 3.

FIG. 8 is a flowchart showing certain basic events performed in a software switch over operation performed by the Internet Protocol (IP) handler in the situation of FIG. 7.

FIG. 9A is a schematic view showing example embodiment of the Internet Protocol (IP) handler of FIG. 2 having redundancy prior to performance of a switch over operation.

FIG. 10 is a flowchart showing certain basic events and actions involved in a central switch over operation performed by an example Internet Protocol (IP) handler.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
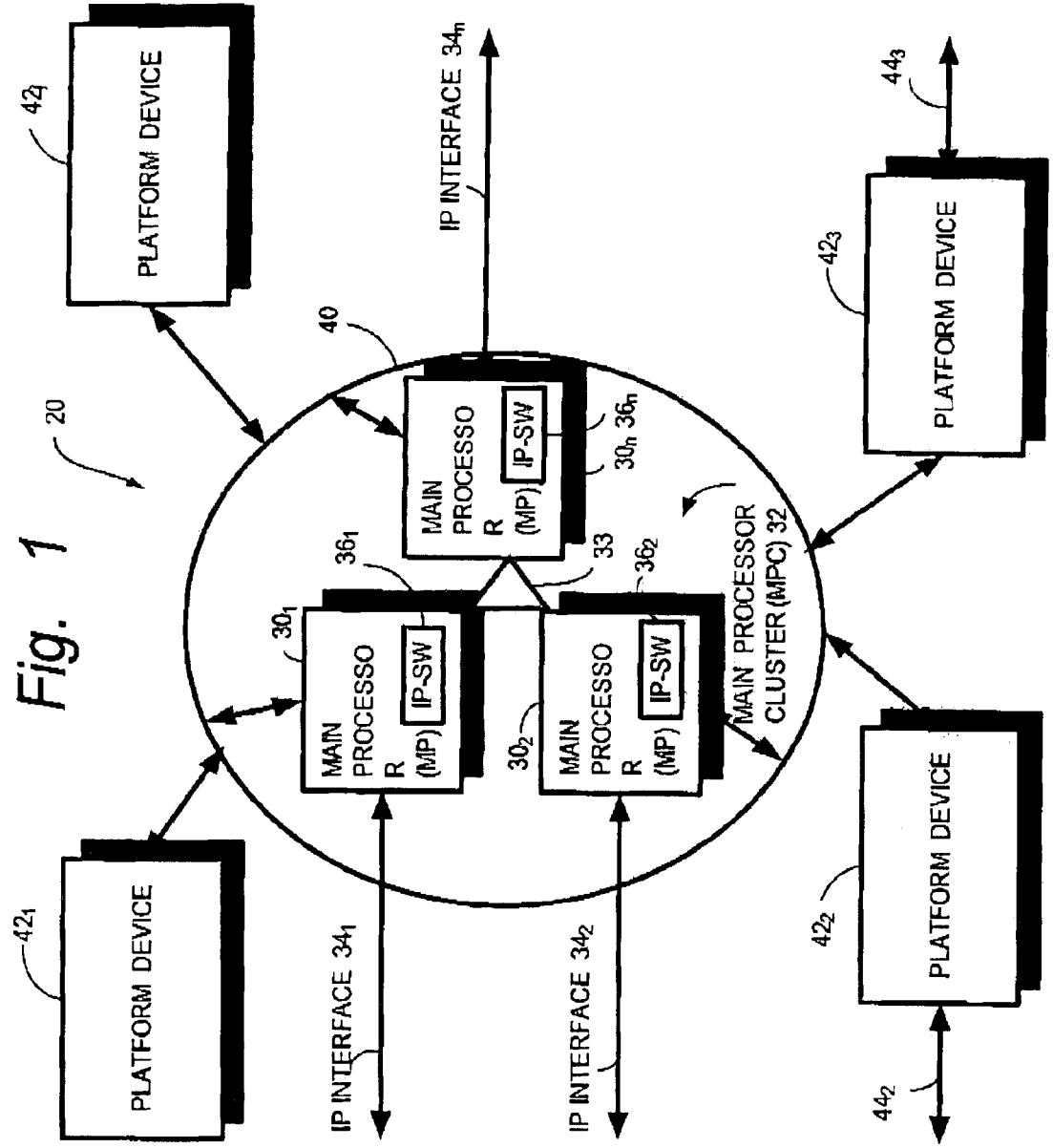
FIG. 1 is a schematic view of a telecommunications platform having a main processor cluster according to an embodiment of the invention.
Figure 2:
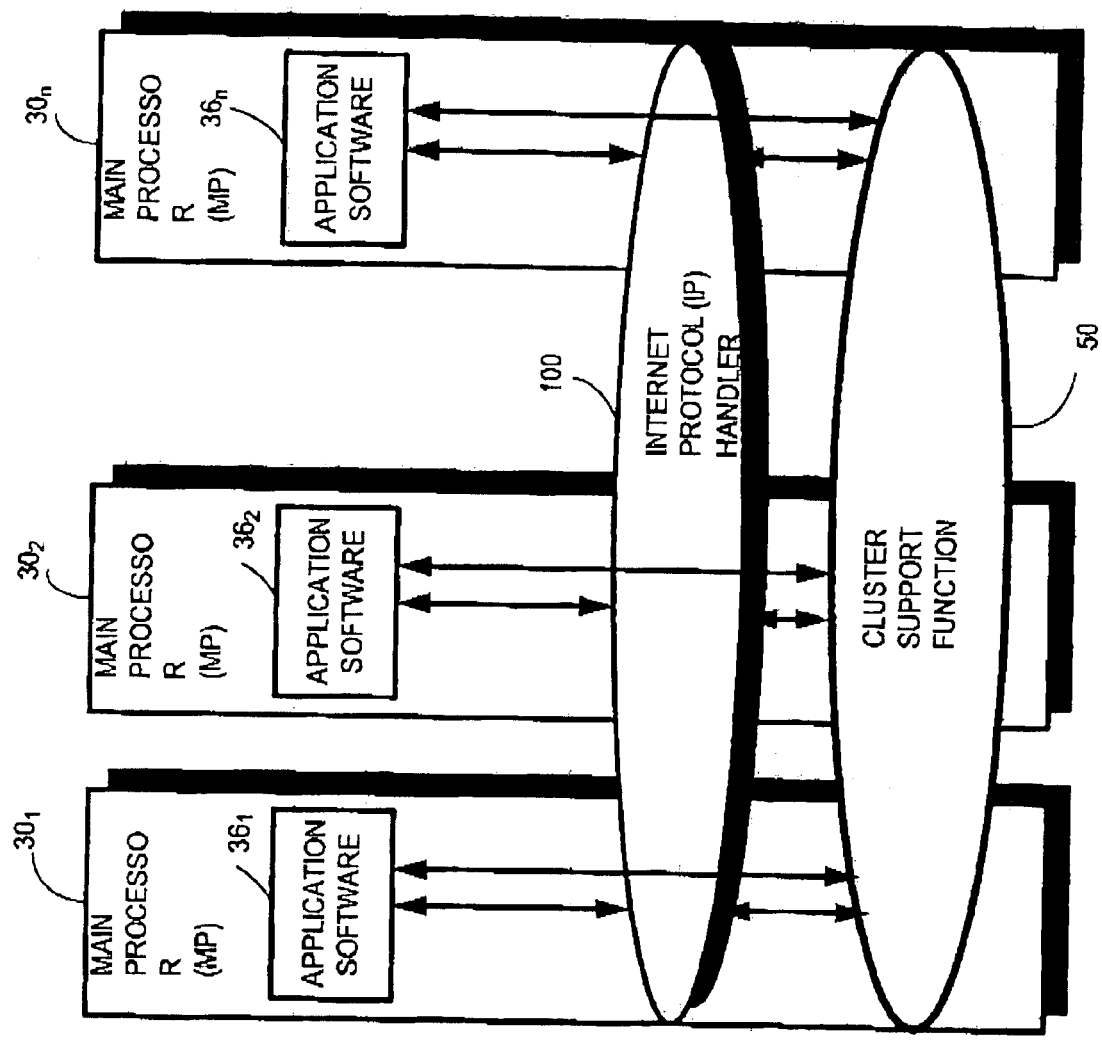
FIG. 2 is a schematic view of showing distribution of an Internet Protocol (IP) handler throughout the main processor cluster of FIG. 1.

In the prior art, many telecommunications platforms have a single processor which serves as a main processor for the platform. The main processor provides an execution environment for application programs and performs supervisory or control functions for other constituent elements of the platform. In contrast to a single processor platform, FIG. 1 shows a generic multi-processor platform 20 of a telecommunications network, such as a cellular telecommunications network, for example, according to the present invention. The telecommunications platform 20 of the present invention has a main processor function of the platform distributed to plural processors 30, each of which is referenced herein as a main processor or MP. Collectively the plural processors 30 comprise a main processor cluster (MPC) 32. FIG. 1 shows the main processor cluster (MPC) 32 as comprising n number of main processors 30, e.g., main processors $30_1$ through $30_n$.

The main processors 30 comprising main processor cluster (MPC) 32 are connected by an inter-processor communication link 33. Furthermore, one or more of the main processors 30 can have an internet protocol (IP) interface for connecting to data packet networks. In the particular platform 20 of FIG. 1, each of the main processors 30 comprising main processor cluster (MPC) 32 is provided with an IP interface 34. The IP interfaces $34_1$–$34_n$ illustrated in FIG. 1 happen to be a first type of IP interface, such as an Ethernet interface, for example. Each of the main processors 30 comprising main processor cluster (MPC) 32 is capable of executing one or more IP-related software applications, also known as IP management services. In this regard, each main processor 30 in FIG. 1 is illustrated as having IP-related software application section 36. As used herein, an IP-related software application (IP-SW) is any software application which uses an IP transport service, such as the TCP, UDP, or raw IP transport services.

The constituent elements of telecommunications platform 20 communicate with one another using an intra-platform communications system 40. In FIG. 1, intra-platform communications system 40 is depicted by a circle which connects to each of the constituent elements of telecommunications platform 20, including to each of the main processors 30 comprising main processor cluster (MPC) 32 as well as to other platform devices 42. Examples of intra-platform communications system 40 include a switch or ethernet LAN interconnecting platform devices.

FIG. 1 shows j number of platform devices 42 included in telecommunications platform 20. The platform devices $42_1$–$42_j$ can, and typically do, have other processors mounted thereon. In some embodiments, the platform devices $42_1$–$42_j$ are device boards. Although not shown as such in FIG. 1, some of these device boards have a board processor (BP) mounted thereon for controlling the functions of the device board, as well as special processors (SPs) which perform dedicated tasks germane to the telecommunications functions of the platform.

Some of the platform devices 42 connect externally to telecommunications platform 20, e.g., connect to other platforms or other network elements of the telecommunications system. For example, platform device $42_2$ and platform device $42_3$ are shown as being connected to inter-platform links $44_2$ and $44_3$, respectively. The inter-platform links $44_2$ and $44_3$ can be bi-directional links carrying telecommunications traffic into and away from telecommunications platform 20. The traffic carried on inter-platform links $44_2$ and $44_3$ can also be internet protocol (IP) traffic which is involved in or utilized by an IP software application(s) executing in section 36 of one or more main processors 30.

Whereas in the prior art each of the main processors 30 comprising main processor cluster (MPC) 32 and having an IP interface 34 would be accorded a separate IP address, in the telecommunications platform 20 of the present invention there is but one IP address for the entire platform. Moreover, in the present invention, although frames of IP data packets incoming to telecommunications platform 20 from outside may be intended for a IP software application executing on one of the main processors 30 of main processor cluster (MPC) 32, such frames can be received on any of the IP interfaces of the platform (since all IP interfaces have the same address) and will be forwarded appropriately to the correct one of main processors 30 for which the frames are intended.

The main processor cluster (MPC) 32 has cluster support function 50 which is distributed over the main processors 30 comprising main processor cluster (MPC) 32. The cluster support function 50 makes the main processor cluster (MPC) 32 robust against hardware faults in the main processors 30 and against software executing on main processors 30. Moreover, cluster support function 50 facilitates upgrading of application software during run time with little disturbance, as well as changing processing capacity during run time by adding or removing main processors 30 of main processor cluster (MPC) 32.

The socket distributed parts 112 provide distributed socket interfaces on all IP-utilizing processors 30 on main processor cluster (MPC) 32. In this regard, the socket distributed parts 112 provide TCP/UDP and raw IP sockets with standard primitives. Software applications using the socket services behave in relation to socket distributed parts 112 in the same way as to a normal socket. The invention is equally applicable whether Berkley standard socket or any other standard socket is employed.

FIG. 3 shows certain aspects of Internet Protocol (IP) handler 100 in more detail. The Internet Protocol (IP) handler 100 comprises distributed socket 102; active IP host and router 104; and interface interconnect 106. As shown in FIG. 3, one of the main processors 30 (i.e., processor $30_2$) comprising main processor cluster (MPC) 32 hosts the IP host and router 104, and for that reason is known as the active central processor for Internet Protocol (IP) handler.

The distributed socket 102 of Internet Protocol (IP) handler 100 comprises a socket active main or central part 110 which is hosted by the active central processor for Internet Protocol (IP) handler. In addition, distributed socket 102 comprises socket distributed parts 112 which are hosted by all IP-involved main processors 30 comprising main processor cluster (MPC) 32, e.g., socket distributed parts $112_1$, $112_2$ and $112_n$ hosted respectively by processors $30_1$, $30_2$, and $30_n$ in the FIG. 3 embodiment.

Data transport through distributed socket 102 between socket central part 110 and socket distributed parts 112 is carried by an intra-cluster link 116, e.g., an OSE-Delta link. As such, each of socket central part 110 and socket distributed parts 112 have an unillustrated OSE-Delta link handler. The socket parts 110, 112 connect to the IP-related software application sections for their respective processors. For example, socket distributed part $112_1$ hosted by main processor $30_1$ is connected to IP-related software application section 36, for the running of IP software applications on main processor $30_1$.

The distributed socket 102 enables IP-related application software executed at any of the main processors 30 of the main processor cluster (MPC) 32 to access a single IP-stack of the platform. The single IP-stack of the platform is located in socket central part 110 and IP host and router 104. Together, socket central part 110 and the socket distributed parts 112 provide the TCP and UDP transport services and access to the raw IP transport service.

The socket distributed parts 112 provide distributed socket interfaces on all IP-utilizing processor 30 in main processor cluster (MPC) 32. In this regard, the socket distributed parts 112 provide TCP/UDP and raw IP sockets with standard primitives. Software applications using the socket services behave in relation to socket distributed parts 112 in the same way as to a normal socket. The invention is equally applicable whether Berkley standard socket or any other standard socket is employed.

As shown in FIG. 4, the socket central part 110 of the distributed socket comprises, e.g., IP-adaption section 120; a socket handler 124; and intra-cluster link handler 126. The socket handler 124 includes TCP/UDP state machines 127 and a set of processor assignment tables 128. The TCP/UDP state machines 127 utilize information about the states of a particular connection. The set of processor assignment tables 128 includes a table for each link interface 162 (see FIG. 6) that has an IP address assigned to it. The distributed socket makes it possible to use one and the same IP address for all applications that communicate with IP and that are executing in main processor cluster (MPC) 32, even though any of the IP addresses can host a set of distributed sockets.

The set of processor assignment tables 128 contains all used TCP/UDP ports (port identifiers) and their localization (e.g., the identity of the hosting one of the processors 30). For TCP and UDP transport services, each processor assignment table 128 can map the used ports to one of the processors 30, as depicted by the left portion of processor assignment table 128 in FIG. 4. For raw IP transport, the processor assignment table 128 indicates on which processor 30 a raw IP socket for a particular protocol number is located, as depicted by the right portion of processor assignment table 128 in FIG. 4. The socket handler 124 thus supervises all processors that host an active application software (i.e., has a used TCP/UDP port or raw IP socket).

The IP-adaption section 120 performs activities such as, for example, packing TCP segments and UDP datagrams into IP packets.

The intra-cluster link handler 126, which in the illustrated embodiment uses the example of an OSE-Delta link handler, is the general mechanism for communication between processors 30 of main processor cluster (MPC) 32. The intra-cluster link 116 uses this communication mechanism to transport TCP segments, UDP datagrams, and data that is sent using the raw IP service to/from the socket central part 110 and for communication between socket central part 110 and socket distributed parts 112 for, e.g., updating processor assignment table 128.

When one of the IP-utilizing software applications creates a socket and binds the socket to a source port number and a source IP address, the socket distributed part 112 on the processor 30 executing that software application communicates (over intra-cluster link 116) the port number, the IP address, and the processor identity to socket central part 110. Upon receipt of such communication, socket handler 124 updates its processor assignment table 128 (see FIG. 4) so that processor assignment table 128 maps the port number to the processor identity in the case of TCP/UDP transport services, and maps protocol numbers to processors for raw IP sockets.

In view of the fact that, in the illustrated embodiment, the IP interfaces 34 are Ethernet interfaces, the interface interconnect 106 is an Ethernet interconnect mechanism which passes all Ethernet frames, no matter which interface 34 receives them, to the same router port (i.e., IP host and router 104) in one copy. An IP-packet addressed to a host of the local area network [LAN] (e.g., a main processors 30 comprising main processor cluster (MPC) 32) is sent on the LAN in one copy.

As shown in FIG. 3, interface interconnect 106 also comprises a central part 140 and distributed parts 142. For example, main processor $30_1$ hosts distributed interface interconnect part $142_1$, main processor $30_2$ hosts distributed interface interconnect part $142_2$, and main processor $30_n$ hosts distributed interface interconnect part $142_n$. The physical ethernet interface on each processor 30 is connected to the appropriate one of the distributed interface interconnect parts 142. As described in more detail subsequently in connection with FIG. 5, an ethernet LAN may be connected via one or more of the physical ethernet interfaces at the same time, or different hosts or routers may be connected to different physical ethernet interfaces.

The interface interconnect central part 140 connects with each of distributed interface interconnect parts 142 over intra-cluster link 146. The intra-cluster link 146 uses the same OSE-Delta communication mechanism as does intra-cluster link 116, but employs the mechanism to transport IP packets packed into ethernet frames between the interface interconnect central part 140 and the distributed interface interconnect parts 142.

In addition, the interface interconnect central part 140 sends out Address Resolution Protocol (ARP) request messages when an IP address needs to be translated to a Medium Access Control (MAC) address. The interface interconnect central part 140 also registers over what physical interface, i.e., from which of the distributed interface interconnect parts 142, a specific ARP response message is received.

Describing aspects including the foregoing in more detail, the interface interconnect central part 140 has an Address Resolution Protocol (ARP) cache. If IP host and router 104 requests transmission of an outgoing IP packet, but the destination IP address is not found in the ARP cache, the interface interconnect central part 140 broadcasts an ARP request message on intra-cluster link 146 to all distributed interface interconnect parts 142. When an ARP response message is received via a particular one of the IP interfaces 34 tied to the distributed interface interconnect parts 142, the received Medium Access Control (MAC) address is forwarded to interface interconnect central part 140, together with a reference to the particular distributed interface interconnect part 142 which received the ARP response message. The outgoing IP packet is then sent as a unicast message across that particular IP interface 34 via which the ARP response message was received, using the reference to the distributed interface interconnect part 142 that received the ARP response message, and using the MAC address received in the ARP response message.

Figure 5:
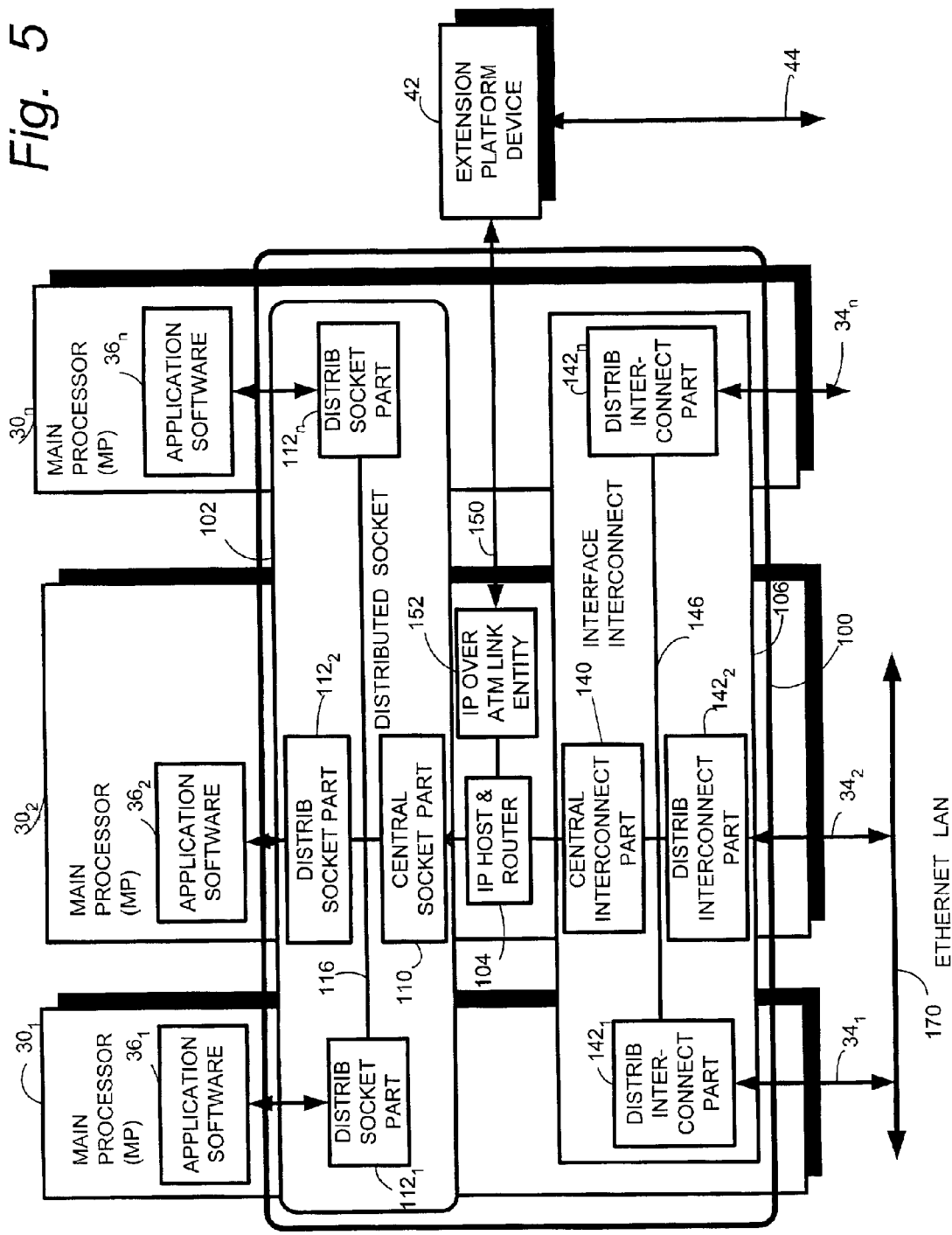
FIG. 5 is a schematic view of the platform of FIG. 1 having various main processors thereof connected to a Ethernet LAN.

FIG. 5 shows a variation of FIG. 3 in which the main processors $30_1$ and $30_2$ are connected via their distributed interface interconnect parts $142_1$ and $142_2$, respectively, to an Ethernet LAN 170. To cater for this situation, the interface interconnect central part 140 also sends out configuration messages to detect loops on an the attached Ethernet LAN 170. That is, the interface interconnect central part 140 determines (e.g., detects) if more than one main processor 30 comprising main processor cluster (MPC) 32 is connected to the same LAN. This detection is achieved by sending management packages (e.g., the configuration messages) on Ethernet LAN 170 and detecting on which interface they will appear. The interface interconnect central part 140, in the case of a loop, picks one of the interfaces to be the active interface and only forwards the user packets to the distributed part tied to that interface (e.g., blocking the other interfaces). In other words, in the loop case, one physical ethernet interface, i.e., one distributed interface interconnect part 142, is used to send out data to that Ethernet LAN 170. On the other hand, if only one MP is connected to the Ethernet LAN 170, the central part forwards the packets to all interfaces.

The distributed interface interconnect part 142 of interface interconnect 106 handles the Ethernet frames and forwards the payload of a received frame to interface interconnect central part 140, and/or assembles a payload received from interface interconnect central part 140 into a frame and forwards it to a distributed interface interconnect part 142. The distributed interface interconnect part 142 is tied to the physical interface 34.

Figure 6:
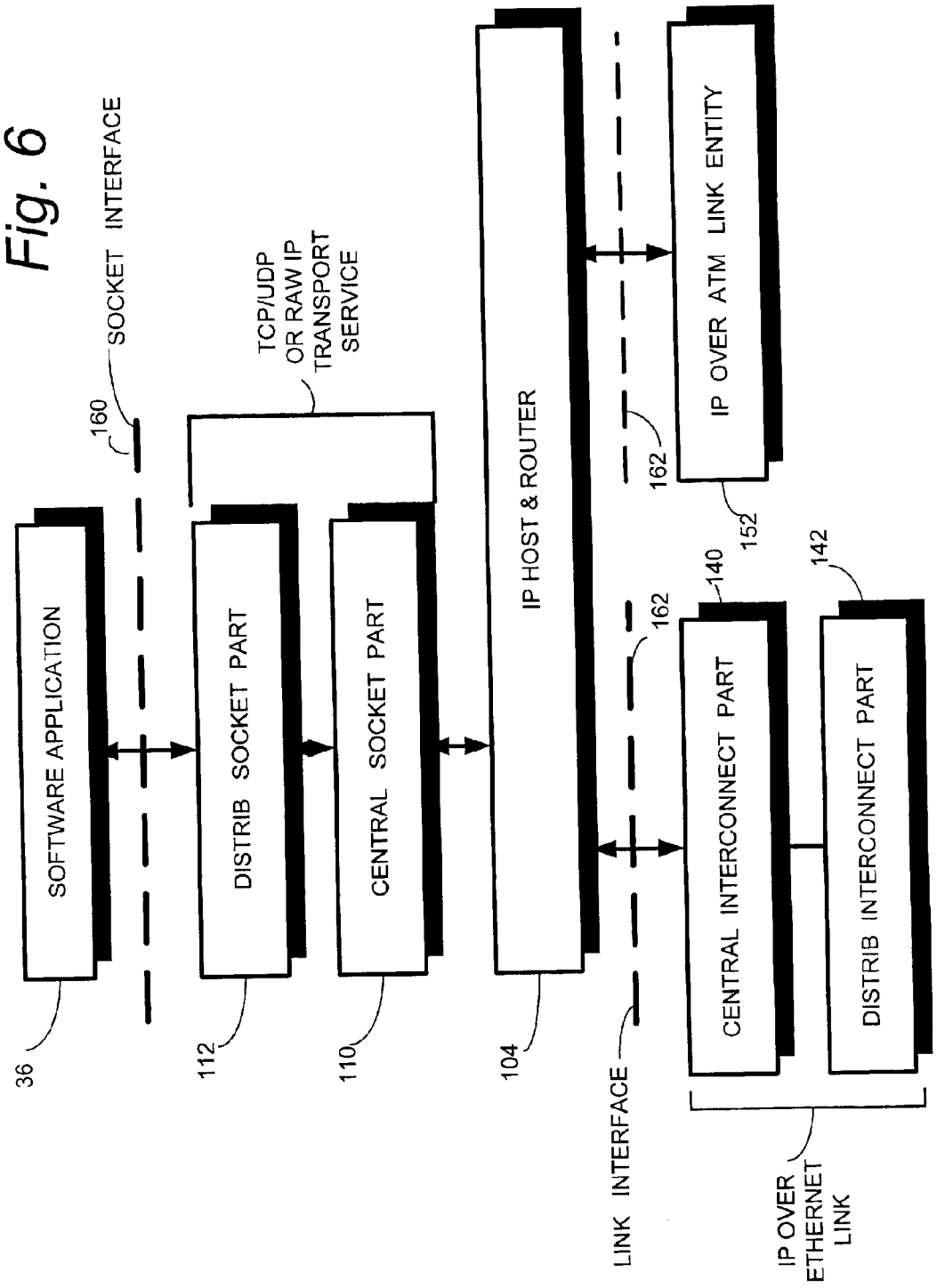
FIG. 6 is a schematic view showing a socket interface and link interfaces for the Internet Protocol (IP) handler of FIG. 2.

FIG. 6 shows, in summary and simplified form, various components of Internet Protocol (IP) handler 100, and further illustrates the location of two interfaces. In particular, FIG. 6 shows a socket interface 160 and link interfaces 162.

By virtue of provision of Internet Protocol (IP) handler 100, main processor cluster (MPC) 32 appears to an external viewer (as well as for IP application software executing in the main processor cluster (MPC) 32) as one single IP processing resource. The fact that main processor cluster (MPC) 32 actually comprises plural main processors 30 need only be known by main processor cluster (MPC) 32 itself. The Internet Protocol (IP) handler 100 can handle socket interfaces on different main processors 30 all having the same address, and makes the IP interface of the main processor cluster (MPC) 32 exchangeable. That is, one need not know which particular one of the plural main processors 30 of main processor cluster (MPC) 32 is hosting the IP-related application software being accessed when selecting an IP interface to connect to main processor cluster (MPC) 32.

In operation, the active socket central part 110 determines that the IP frames incoming to the platform are destined to the one of the plural processors of the cluster executing the internet protocol (IP) software application. The incoming frames can be received on any of the IP interfaces, such as IP interfaces 34, for example. The determination is made with reference to processor assignment table 128 (see FIG. 4). The socket central part 110 forwards TCP segments, UDG datagrams or IP frames (in case of that the raw IP transport service is used) to socket distributed parts 112 for the correct processor (e.g., the processor executing the socket bound to the destination IP address and the destination port). The internet protocol (IP) software application receives the IP frames from the socket distributed part.

The IP host and router 104 works in a context of several types of connected links. For example, IP host and router 104 works with links connected to interface interconnect central part 140 and links connected to socket central part 110. Moreover, in another embodiment illustrated in FIG. 3A, distributed socket 102 works with adoptions to other IP interfaces, such as ATM links (RFC 1483).

Figure 3A:
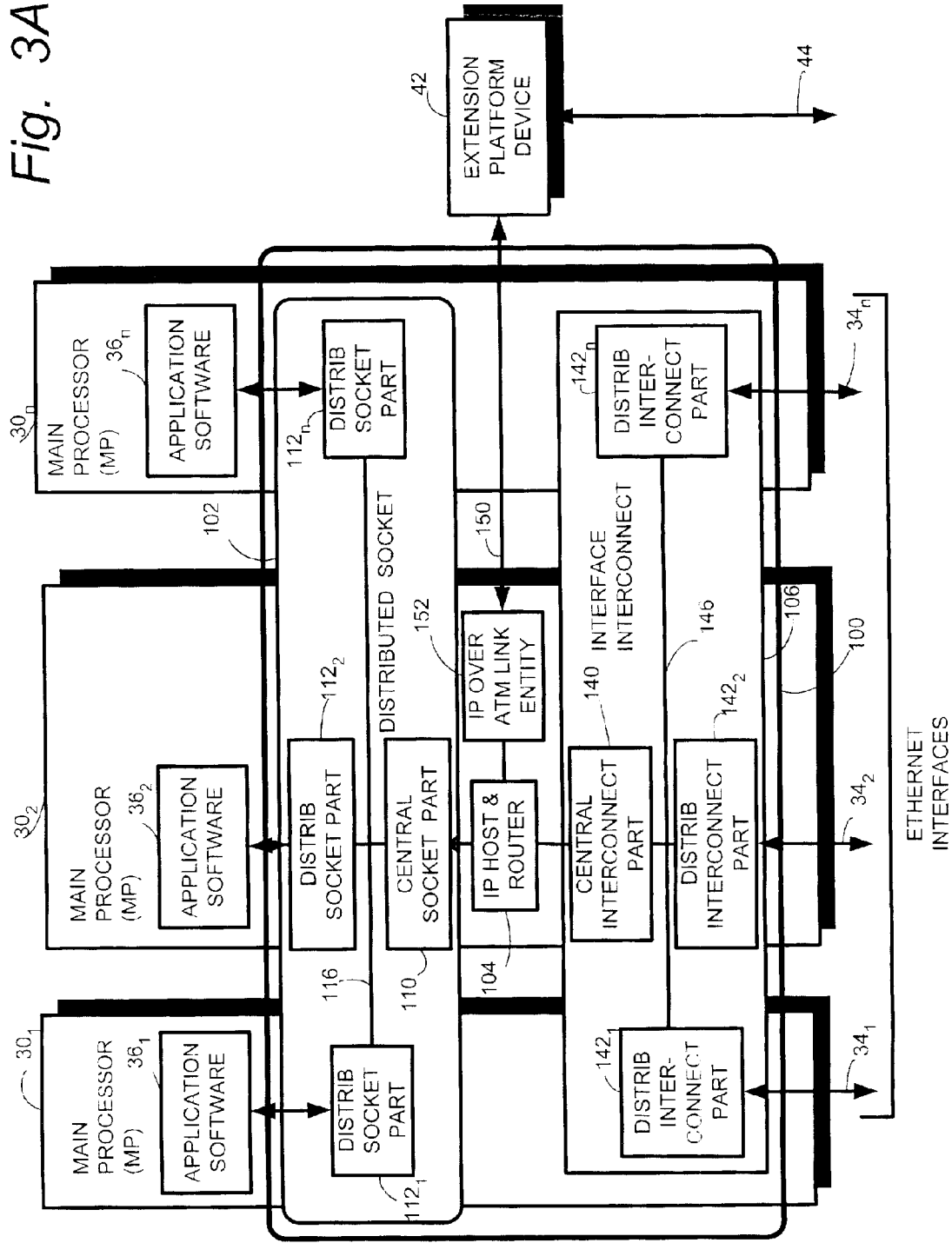
FIG. 3A is a schematic view showing another example embodiment of the Internet Protocol (IP) handler of FIG. 2.

In the above regard, in the FIG. 3 embodiment Internet Protocol (IP) handler 100 provided a same IP address despite the fact that telecommunications platform 20 had plural IP interfaces 34 of a first type. In the foregoing discussion, the example of an Ethernet IP interface was provided as a first type of IP interface. FIG. 3A shows an embodiment of Internet Protocol (IP) handler 100A for a scenario in which the platform includes a second type of IP interface. In particular, in the FIG. 3A embodiment, IP data packets can also be received (for an IP software application executing on one of main processors 30 of main processor cluster (MPC) 32) on another type of IP interface over inter-platform link 44 from outside of telecommunications platform 20. In the illustrated embodiment, the example second type of IP interface is an Asynchronous Transfer Mode (ATM) interface over an ATM bidirectional link such as inter-platform link 44. The invention is equally applicable with interfaces other than ATM as the second type, for example a link based on the Point to Point Protocol (PPP).

In the FIG. 3A embodiment, the ATM cells constituting the IP frames are received at extension platform device 42, and are forwarded over link 150 (RFC1483) to IP over ATM link entity 152. The IP over ATM link entity 152 resides on the same processor that host the active IP host and router 104, and is connected to IP host and router 104 as shown in FIG. 3A.

The IP over ATM link entity 152 comprises an end point for an outgoing ATM connection and functionality for mapping IP packets to the ATM (AAL5) connection according to RFC 1483. Although for sake of simplicity only one IP over ATM link is shown attached to IP host and router 104 in FIG. 3A it should be understood that more than one IP over ATM link can be provided, e.g., in a situation in which IP host and router 104 is connected to other hosts/routers.

The provision of this second type of IP interface makes it possible to reach any IP software application using ATM transport, regardless of which of the main processors 30 in main processor cluster (MPC) 32 is hosting or executing the IP software application.

Thus, in the example platform of FIG. 3A, it is possible to have internet protocol communications over both (1) the Ethernet interfaces 34 of the plural processors comprising the MPC; and (2) the external links (e.g., the ATM links 44 connected to the ETs). Moreover, an objective of the example platform is to have one IP address for all applications executed by the processors of the MPC, despite the numerous IP interfaces owned by the platform. In other words, the platform has one IP address for all applications, e.g., HTTP, Telnet, Corba, SNMP, FTP, etc.

Figure 7:
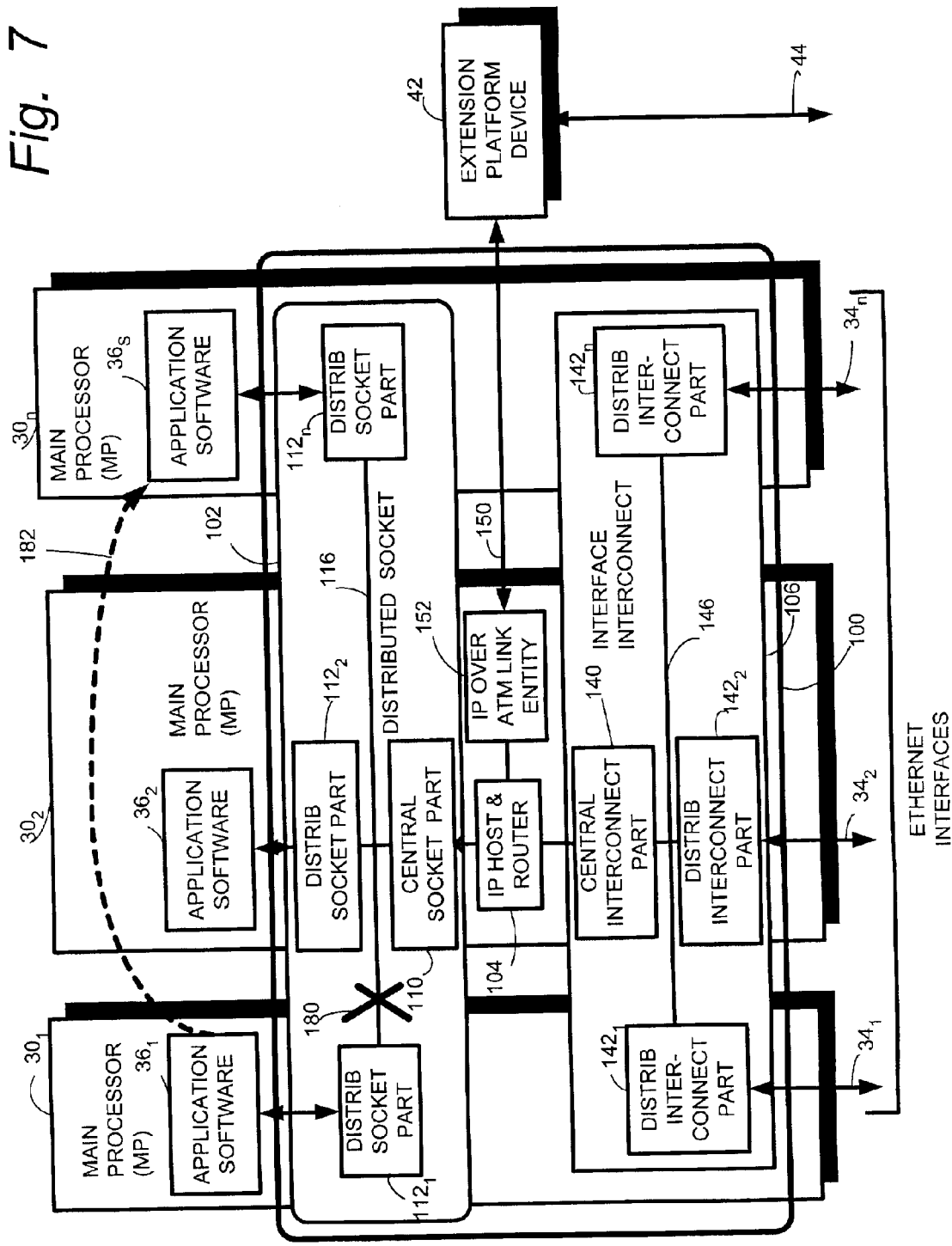
FIG. 7 is a schematic view showing redundancy in case of a fault occurring in a platform having the Internet Protocol (IP) handler of FIG. 3A.

FIG. 7 illustrates how the Internet Protocol (IP) handler 100, being distributed over main processor cluster (MPC) 32, provides redundancy in the case of failure, e.g., a failure of one of the main processors 30 comprising main processor cluster (MPC) 32 or of a link connecting the processors 30. In particular, FIG. 7 depicts a loss of communication with processor $30_1$ of FIG. 3A as failure 180. Upon occurrence of failure 180, communication is lost with execution of IP-related application software $36_1$. Thus, there is a need to have the failure-affected application software 36 move to another processor of main processor cluster (MPC) 32, so that utilization thereof can continue. In the situation shown in FIG. 7, it so happens that, for the failure-affected application software $36_1$, there is a standby application software module $36_s$ loaded on processor $30_n$. Thus, the task is now for Internet Protocol (IP) handler 100 to allow the failure-affected application software migrate from the failure-affected processor $30_f$ to the standby processor $30_n$, as illustrated by broken line 182 in FIG. 7.

Certain basic events involved in the software switch over or software migration operation illustrated by FIG. 7 are illustrated in the flowchart of FIG. 8. In FIG. 8, the processor $30_2$ is shown as the processor which holds the socket central part 110, while processor $30_n$ is the processor which has an activated socket distributed part 112 and the standby version of the failure-affected application software. Event 8-1 shows processor $30_2$ detecting loss of communication with the socket distributed part 112$_i$ of processor $30_1$. Upon the detection of such loss of communication, as event 8-2 the socket central part 110 removes the mapping from processor assignment table 128 for the processor that held the socket distributed part 112 with which communication has been lost (e.g., the mapping for processor $30_1$ having socket distributed part 112$_j$). Event 8-3 shows the standby application software 36$_s$ being activated on processor $30_n$. After the activation of event 8-3, the standby application software 36$_s$ requests and obtains a socket from socket distributed part 112$_n$. As event 8-5, the socket distributed part 112$_n$ communicates with socket central part 110, apprising socket central part 110 (over intra-cluster link 116) of the port number/protocol number, the IP address, and the processor identity to socket central part 110. Upon receipt of such communication, as event 8-6 the socket handler 124 of socket central part 110 updates its processor assignment table 128 (see FIG. 4) so that processor assignment table 128 maps the port number to the processor identity in the case of TCP/UDP transport services, and maps protocol numbers to processors for raw IP sockets.

The foregoing description involving FIG. 7 and FIG. 8 pertains to an application software switch or move over operation, which can occur in case of a failure. It can happen that the failure involves the particular processor which hosts the active socket central part 110, the active IP host and router 104, and the active interface interconnect 106. Even in such case, the Internet Protocol (IP) handler 100 has redundancy, as explained below.

FIG. 9A shows another embodiment of Internet Protocol (IP) handler 100R, and particularly an embodiment having redundancy and/or fault tolerance with respect to Internet Protocol (IP) handler 100R itself. The Internet Protocol (IP) handler 100R of FIG. 9A differs from that of FIG. 3A in that at least one of the main processors 30 of main processor cluster (MPC) 32 hosts certain standby central functions. In particular, as shown in FIG. 9A, for Internet Protocol (IP) handler 100R the main processor $30_n$ hosts each of the following: standby IP host and router 104S; standby socket central part 110S; standby interface interconnect central part 140S; and standby IP over ATM link entity 152S. In view of the standby nature of each of IP host and router 104S, socket central part 110S, interface interconnect central part 140S, and IP over ATM link entity 152S, these elements are shown in broken lines in FIG. 9A (since the IP host and router 104, socket central part 110A, and interface interconnect central part 140 remain active). As explained in further detail below with reference to FIG. 10, upon occurrence of a predetermined event (such as a failure of the processor $30_2$ which hosts IP host and router 104), the standby IP host and router 104S assumes the functions of the IP host and router 104. Moreover, the standby socket central part 110S becomes the active socket central part in view of failure of socket central part 110; the standby interface interconnect central part 140S becomes the active interface interconnect central part in view of failure of interface interconnect central part 140; and the standby IP over ATM link entity 152S becomes the active IP over ATM link entity.

FIG. 10 shows certain basic events and actions involved in a switch over operation performed by Internet Protocol (IP) handler 100R of FIG. 9A. Event 10-1 involves detection of a predetermined event which triggers the switch over operation of FIG. 10. The triggering predetermined event could be, for example, detection of a failure of the active central processor (e.g., main processor $30_2$ in the FIG. 9A embodiment, since main processor $30_2$ hosts IP host and router 104, socket central part 110, and interface interconnect central part 140). Such failures are detected by the operating system on the main processors or any hardware or software supervision function that detects errors and reports them to the operating system.

Figure 9B:
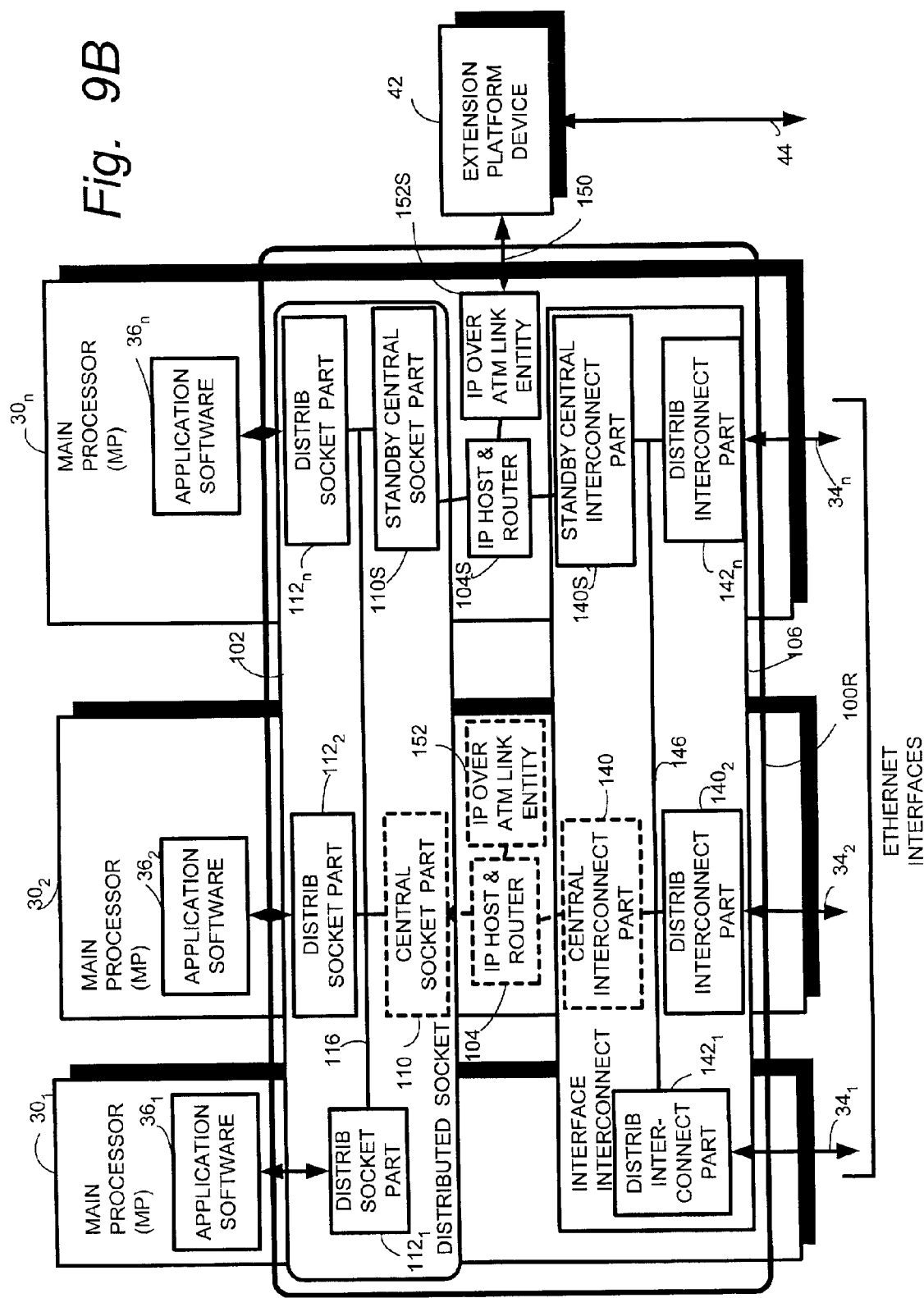
FIG. 9B is a schematic view showing example embodiment of the Internet Protocol (IP) handler of FIG. 2 having redundancy during performance of a switch over operation.

Upon detection of the predetermined event 10-1, as events 10-2 through 10-5 each of the following are activated by cluster support function 50: the standby IP host and router 104S; standby socket central part 110S; standby interface interconnect central part 140S; and standby IP over ATM link entity 152S. As illustrated in FIG. 9A, each of standby IP host and router 104S; standby socket central part 110S; standby interface interconnect central part 140S; and standby IP over ATM link entity 152S are hosted by processor $30_n$. Activation of each of standby IP host and router 104S; standby socket central part 110S; standby interface interconnect central part 140S; and standby IP over ATM link entity 152S is depicted in FIG. 9B, wherein each of these standby elements is now shown in solid lines rather than broken lines. The elements of Internet Protocol (IP) handler 100R hosted by former active central processor $30_2$ are eliminated in FIG. 9A in view of their failure or other unavailability.

Then, assuming that the Internet Protocol (IP) handler 100R has the ATM IP interfaces such as interface 44, events 10-5 and 10-6 are performed. At event 10-5, the ATM connection terminations and the link from the ET board are moved to the standby active central processor, e.g., processor $30_n$ in the FIG. 9B scenario. In this regard, ATM connections that are used to carry IP packets have their end points on the processor 30 where the IP host and router 104 is executing. If the IP host and router function moves to another processor, e.g., from processor $30_2$ to processor $30_n$, then the ATM connection end points must be moved to that processor (e.g., attached to that processor [event 10-6]), and thus the IP over ATM link entity must also be moved.

Lastly, as event 10-7, the activated standby IP host and router 104S is started. Upon starting, the activated standby IP host and router 104S starts collecting routing data from the network in order to re-build its processor assignment table 128. Alternatively, the activated standby IP host and router 104S can reuse the processor assignment table 128 formerly maintained by IP host and router 104. The information in the processor assignment table 128 is continuously replicated from the active socket central part 110 to the processor where by standby socket central part 110S is located. The cluster support function 50 provides a service (e.g., state storage system) that makes it possible for an active function to transfer data to a memory area on a processor where a standby function is located and where it can be retrieved by the standby function when it is activated.

Thus, the Internet Protocol (IP) handler 100R provides both an active IP host and router 104 and standby IP host and router 104S together with mechanisms that automatically redirect attached IP-links (sockets, ATM, Ethernet) in case of a redundancy switch over. The Internet Protocol (IP) handler 100R ensures the presence of a router always connected to all IP links defined for the router. In other words, the router function is tolerant against failure (e.g., failure of one of the main processors 30).

In case of failure of one of main processors 30 (either a hardware or software failure), the active central processor removes the corresponding entries from its processor assignment table 128 and stops supervising the failed processor 30. Moreover, the cluster support function ensures that a IP-related software application afflicted by the failure is restarted on another processor of main processor cluster (MPC) 32. The application software then binds to the distributed part on its newly hosted processor, e.g., binds to socket distributed part 112 and distributed interface interconnect part 142.

As described above, in the present invention plural processors 30 of main processor cluster (MPC) 32 have a same IP address. Internet Protocol (IP) handler 100 forwards IP frames received from outside the platform on any of the plural IP interfaces and addressed to the same IP address to a correct one of the plural processors executing an IP software application. The application software programmer does not have to be aware of the different main processors 30 in main processor cluster (MPC) 32, but can merely create the program and bind it to a socket in the common way without having to consider issues of program localization, In essence, the main processor cluster (MPC) 32 looks like a single workstation. Moreover, a certain robustness is provided in connecting more than one Ethernet interface to the same LAN.

It is possible to have many links of different types connected to IP host and router 104 via link interfaces. Each link interface has an IP address, and thus there is more than one address that can be used by the software applications 36 in the main processor cluster (MPC) 32. In this invention, all software applications 36 in main processor cluster (MPC) 32 can use one and the same IP address.

Figure 11:
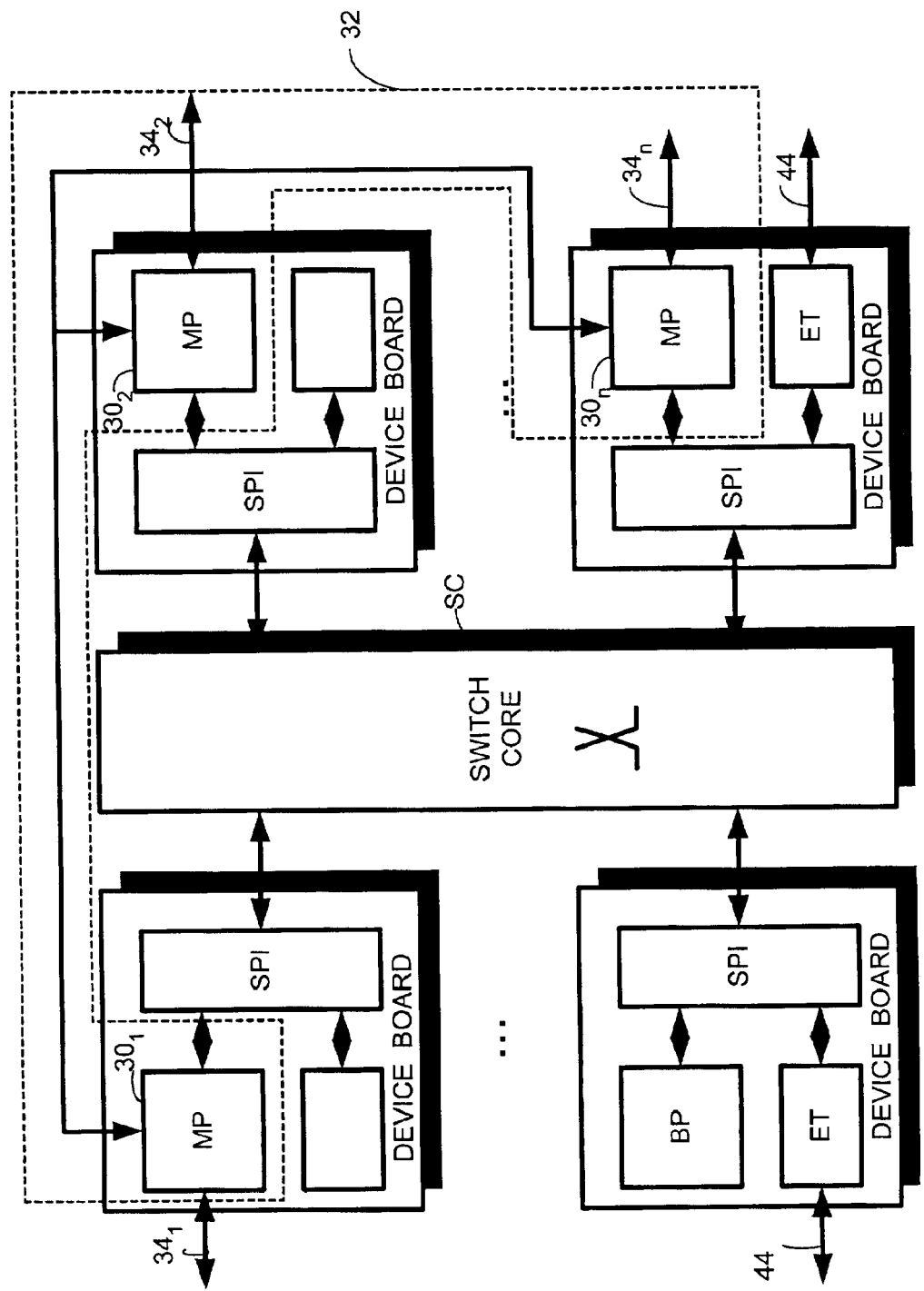
FIG. 11 is a schematic view of one example embodiment of a ATM switch-based telecommunications platform having the Internet Protocol (IP) handler of the invention.

FIG. 11 shows one example embodiment of a ATM switch-based telecommunications platform having the Internet Protocol (IP) handler 100 of the invention. In the embodiment of FIG. 11, each of the main processors 30 comprising main processor cluster (MPC) 32 are situated on a board known as a device board. The main processor cluster (MPC) 32 is shown framed by a broken line in FIG. 11. The main processors 30 of main processor cluster (MPC) 32 are connected through a switch port interface (SPI) to a switch fabric or switch core SC of the platform. Devices on the device boards of the platform communicate via the switch core SC. In addition to the switch port interface (SPI), each device board can have plural devices mounted thereon. In the illustrated embodiment there being as many as four devices situated on a device board (only two devices are shown on each board). In fact, some of the device boards are known as extension terminals (ETs) in view of the fact that devices thereon handle links which connect external to the platform, e.g., interfacing ATM links 44. In general, each of the devices on the device board connect through the switch port interface to the switch core SC.

Whereas the platform of FIG. 11 is a single stage platform, it will be appreciated by those skilled in the art that the Internet Protocol (IP) handler of the present invention can be implemented in a main processor cluster (MPC) realized in multi-staged platforms. Such multi-stage platforms can have, for example, plural switch cores (one for each stage) appropriately connected via extension terminals (ETs) or the like. The main processors 30 of the main processor cluster (MPC) 32 can be distributed throughout the various stages of the platform, with the same or differing amount of processors (or none) at the various stages.

Various aspects of ATM-based telecommunications are explained in the following: U.S. patent applications Ser. No. 09/188,101 [PCT/SE98/02325] and Ser. No. 09/188,265 [PCT/SE98/02326] entitled "Asynchronous Transfer Mode Switch"; U.S. patent application Ser. No. 09/188,102 [PCT/SE98/02249] entitled "Asynchronous Transfer Mode System", all of which are incorporated herein by reference.

As understood from the foregoing, the present invention is not limited to an ATM switch-based telecommunications platform, but can be implemented with other types of platforms. Moreover, the invention can be utilized with single or multiple stage platforms. Aspects of multi-staged platforms are described in U.S. patent application Ser. No. 09/249,785 entitled "Establishing Internal Control Paths in ATM Node" and U.S. patent application Ser. No. 09/213,897 for "Internal Routing Through Multi-Staged ATM Node," both of which are incorporated herein by reference.

The present invention applies to telecommunications platforms of diverse types, including (for example) base station nodes and base station controller nodes (radio network controller [RNC] nodes) of a cellular telecommunications system. Example structures showing telecommunication-related elements of such nodes are provided, e.g., in U.S. patent application Ser. No. 09/035,821 [PCT/SE99/00304] for "Telecommunications Inter-Exchange Measurement Transfer," which is incorporated herein by reference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, while the intra-cluster link handler 126 has been illustrated as being an OSE-Delta link handler, other types of link handlers can instead be utilized. Moreover, the second type of IP interface need not be limited to an ATM interface, but can be some other type of transport instead.

What is claimed is:

1. A method of operating a telecommunications platform, the method comprising:

using a cluster of processors to perform collectively a platform processing function, the plural processors of the cluster having Internet Protocol (IP) capabilities and respective plural IP interfaces;

using a same IP address for each of the plural processors of the cluster;

distributing an Internet Protocol (IP) handling function throughout the cluster with Internet Protocol (IP) whereby IP frames received from outside the platform on any of the plural IP interfaces and addressed to the same IP address are forwarded to a correct one of the plural processors executing an IP software application;

passing IP frames incoming to the platform to a router regardless of which of the plural IP interfaces receives the frames, the router being hosted by one of the plural processors of the cluster;

using the router to route the IP frames to an active socket central part;

determining at the active socket central part that the IP frames incoming to the platform are destined to the one of the plural processors of the cluster executing the internet protocol (IP) software application;

forwarding the IP frames to a socket distributed part hosted by the one of the plural processors of the cluster executing the internet protocol (IP) software application;

receiving the IP frames at the internet protocol (IP) software application from the socket distributed part.

2. The method of claim 1, further comprising:

connecting the plural processors of the cluster to respective plural IP interfaces of a first type; and connecting the router to an IP interface of a second type.

3. The method of claim 2, wherein the IP interface of the first type is an Ethernet interface and wherein the IP interface of the second type is an ATM interface.

4. The method of claim 1, further comprising:
routing IP frames received at any of the plural IP interfaces via an interface interconnect distributed part to an interface interconnect central part, the interface interconnect central part being hosted by a same processor which hosts the router; and
routing the IP frames from the interface interconnect central part to the router, the interface interconnect central part being hosted by a same processor which executes the internet protocol (IP) software application.

5. The method of claim 1, further comprising:
detecting the occurrence of a predetermined condition; and then
activating a standby router hosted by another processor of the cluster;
rendering as active a standby socket central part hosted by the another processor of the cluster;
the standby router assuming the functions of the router and the socket inactive central part becoming the active socket central part.

6. A telecommunications platform comprising:
a cluster of processors which collectively perform a platform processing function, plural processors of the cluster having Internet Protocol (IP) capabilities and respective plural IP interfaces;
an Internet Protocol (IP) handler distributed throughout the cluster whereby the plural processors have a same IP address, the Internet Protocol (IP) handler forwarding IP frames received from outside the platform on any of the plural IP interfaces and addressed to the same IP address to a correct one of the plural processors executing an IP software application, wherein the Internet Protocol (IP) handler comprises:
a router hosted by at least one of the processors of the cluster;
an interface interconnect hosted in distributed manner by the plural processors, the interface interconnect serving to interconnect the plural IP interfaces to the router and to pass IP frames incoming to the platform to the router regardless of which of the plural IP interfaces receives the frames; and
a socket hosted in distributed manner by the plural processors, the socket being connected to the router through which the internet protocol (IP) software application receives the IP frames.

7. The apparatus of claim 6, wherein the socket comprises:
an active socket central part hosted by the at least one of the processors of the cluster that hosts the router, the active socket central part being connected to the router;
a socket distributed part hosted by the one of the processors of the cluster executing the internet protocol (IP) software application;
wherein the active socket central part determines that the IP frames incoming to the platform are destined to the one of the plural processors of the cluster executing the internet protocol (IP) software application and forwards the IP frames to the socket distributed part, and wherein the internet protocol (IP) software application receives the IP frames from the socket distributed part.

8. The apparatus of claim 6, wherein the plural processors of the cluster are connected to respective plural IP interfaces of a first type; and wherein the platform further comprises an IP interface of a second type, the IP interface of the second type being connected to the router.

9. The apparatus of claim 8, wherein the IP interface of the first type is an Ethernet interface and wherein the IP interface of the second type is an ATM interface.

10. The apparatus of claim 6, wherein the interface interconnect comprises:
an interface interconnect central part hosted by the at least one of the processors of the cluster that hosts the router; and
an interface interconnect distributed part hosted by the one of the processors of the cluster that executes the internet protocol (IP) software application.

11. The apparatus of claim 6, further comprising:
a standby router hosted by another processor of the cluster;
a standby socket central part hosted by the another processor of the cluster;
whereupon occurrence of a predetermined event, the standby router assumes the functions of the router and the standby socket central part becomes the active socket central part.

12. The apparatus of claim 11, wherein the predetermined event is failure of the at least one of the processors of the cluster that hosts the router.

13. A telecommunications platform comprising:
a cluster of processors which collectively perform a platform processing function, plural processors of the cluster having Internet Protocol (IP) capabilities and respective plural IP interfaces, the plural processors of the cluster all having a same IP address;
an Internet Protocol (IP) handler distributed throughout the cluster which renders the IP interfaces of the plural processors of the cluster exchangeable whereby knowledge of which one of the plural processors of the cluster is hosting an IP software application being accessed is unnecessary when selecting one of the plural IP interfaces for connecting to the cluster, wherein the Internet Protocol (IP) handler comprises:
a router hosted by at least one of the processors of the cluster;
an interface interconnect hosted in distributed manner by the plural processors, the interface interconnect serving to interconnect the plural IP interfaces to the router and to pass IP frames incoming to the platform to the router regardless of which of the plural IP interfaces receives the frames; and
a socket hosted in distributed manner by the plural processors, the socket being connected to the router through which the internet protocol (IP) software application receives the IP frames.

14. The apparatus of claim 13, wherein the socket comprises:
an active socket central part hosted by the at least one of the processors of the cluster that hosts the router, the active socket central part being connected to the router;
a socket distributed part hosted by the one of the processors of the cluster executing the internet protocol (IP) software application;
wherein the active socket central part determines that the IP frames incoming to the platform are destined to the one of the plural processors of the cluster executing the internet protocol (IP) software application and forwards the IP frames to the socket distributed part, and wherein the internet protocol (IP) software application receives the IP frames from the socket distributed part.

15. The apparatus of claim 13, wherein the plural processors of the cluster are connected to respective plural IP interfaces of a first type; and wherein the platform further comprises an IP interface of a second type, the IP interface of the second type being connected to the router.

16. The apparatus of claim 15, wherein the IP interface of the first type is an Ethernet interface and wherein the IP interface of the second type is an ATM interface.

17. The apparatus of claim 13, wherein the interface interconnect comprises:
- an interface interconnect central part hosted by the at least one of the processors of the cluster that hosts the router; and
- an interface interconnect distributed part hosted by the one of the processors of the cluster that executes the internet protocol (IP) software application.

18. The apparatus of claim 13, further comprising:
- a standby router hosted by another processor of the cluster;
- a standby socket central part hosted by the another processor of the cluster;
- whereupon occurrence of a predetermined event, the standby router assumes the functions of the router and the standby socket central part becomes the active socket central part.

19. The apparatus of claim 18, wherein the predetermined event is failure of the at least one of the processors of the cluster that hosts the router.

* * * * *